Feb. 20, 1968 R. W. BENNETT ET AL 3,369,881
CATHODE RAY TUBE ENVELOPES AND METHODS OF PREPARING
PARTS THEREFOR AND FABRICATING SUCH ENVELOPES
Filed Oct. 28, 1964 4 Sheets-Sheet 1

INVENTORS
Robert W. Bennett
Wendell S. Blanding
BY
*Clarence R. Batty*
ATTORNEY

Feb. 20, 1968  R. W. BENNETT ET AL  3,369,881
CATHODE RAY TUBE ENVELOPES AND METHODS OF PREPARING
PARTS THEREFOR AND FABRICATING SUCH ENVELOPES
Filed Oct. 28, 1964  4 Sheets-Sheet 2

INVENTORS
Robert W. Bennett
Wendell S. Blanding

By Clarence R Batty

ATTORNEY

Feb. 20, 1968  R. W. BENNETT ET AL  3,369,881
CATHODE RAY TUBE ENVELOPES AND METHODS OF PREPARING
PARTS THEREFOR AND FABRICATING SUCH ENVELOPES
Filed Oct. 28, 1964  4 Sheets-Sheet 4

INVENTORS
Robert W. Bennett
Wendell S. Blanding
BY
ATTORNEY

United States Patent Office 3,369,881
Patented Feb. 20, 1968

3,369,881
CATHODE RAY TUBE ENVELOPES AND METHODS OF PREPARING PARTS THEREFOR AND FABRICATING SUCH ENVELOPES
Robert W. Bennett, Corning, and Wendell S. Blanding Painted Post, N.Y., assignors to Corning Glass Works, Corning, N.Y., a corporation of New York
Filed Oct. 28, 1964, Ser. No. 407,180
6 Claims. Cl. 65—58)

ABSTRACT OF THE DISCLOSURE

Viewing panel portions and funnel portions used in the fabrication of rectangular glass television picture tube envelopes are provided with three reference protuberances projecting outwardly from two adjacent ones of the sidewalls of each respective portion and summits one precisely ground on said protuberances so that when corresponding ones of such summits on a viewing panel portion and a funnel portion are precisely referenced to each other, with the sealing edges of such portions abutting, a geometrically matched relationship between the abutted portions is attained.

The present invention relates to cathode ray tube envelopes. More particularly the invention relates to a method of preparing parts for the fabrication of glass cathode ray or television picture tube envelopes having the configuration conventionally known in the art as rectangular. Still more specifically, the present invention relates to a method of preparation of parts for the fabrication of glass cathode ray tube envelopes, each including a neck portion, a funnel portion and a rectangular concavo-convex viewing panel portion which are sealed together to form a completed tube envelope.

One process generally in use today in the manufacture of cathode ray or picture tubes for use in color television sets employs the steps of introducing different color emitting phosphor particles directly to the inside surface of the face plate of each of the viewing panels to be used in the manufacture of such tubes, and thereafter permanently coating such surface of each of said face plate with a line-like or dot-like discrete pattern of each of the different color emitting phosphors introduced to said surface. One method of depositing said discrete patterns of the different color phosphors is the photographic method wherein the different color phosphors are introduced, one at a time, to the inner surface of the face plate of a viewing panel. In such method, a photosensitive emulsion, along with one of the color phosphors, is introduced to said surface of the face plate which is then exposed, through a precisely positioned aperture mask, to a point light source, such mask exposing said emulsion to said source in a particular discrete line-like or dot-like pattern. The mask is thereafter removed, the exposed dots or lines of the exposed emulsion are developed causing such exposed areas of the emulsion as well as the corresponding areas of the color phosphor to be permanently deposited on the face plate surface, and the unexposed emulsion and its corresponding areas of the color phosphor are thereafter washed or rinsed from said surface. The aperture mask is then replaced in said precise position and the above described step is then repeated for the deposition of each next color phosphor, the point light source being moved to a different predetermined position for the deposition of each such additional phosphor. Thus, a discrete pattern of each of the different color emitting phosphors is deposited on said surface of the face plate of the viewing panel. The details of such deposition of the patterns of the color emitting phosphors are well known to those skilled in the art of manufacturing color television picture tubes, and such method forms no part of the present invention but is briefly discussed above for purposes of a clearer understanding of the problems solved by the present invention. It is to be pointed out, however, that the previously mentioned different positioning of said light source, for the purpose of the exposure and subsequent development of each of the patterns of the color phosphor coatings provided on a viewing panel, must precisely conform to the paths to be taken by the electrons selectively beamed from an electron gun, or battery of such guns, provided in the neck of the tube envelope of which said viewing panel subsequently forms a part. Such precision is necessary to the production of the various colors of the picture to be displayed by the completed picture tube, as is also well known to those skilled in the art.

In the mass production of polychromatic cathode ray or television picture tubes, multiplicities of complemental tube envelope parts including viewing panels, funnels and necks of prescribed dimensions and configurations are formed and one of each such parts is thereafter randomly selected from said multiplicities of parts and such selected sets of parts are subsequently sealed together to form a tube envelope. However, prior to such sealing, the inner surface of the face plate of each viewing panel is provided with discrete patterns of color emitting phosphor particles by the method, for example, previously discussed. In order, therefore, to assure that the previously discussed precise alignment of an electron gun with said discrete patterns of color phosphors may be attained in the manufacture of each of a plurality of color television picture tubes from randomly selected parts used to fabricate each such tube, it is necessary, for the use of mass production techniques including such random selection of parts, to provide a method by which the associated parts of each randomly selected set of parts may be referenced to each other for sealing thereof to form tube envelopes each optimumly identical to the others insofar as the attainment of said precise alignment is concerned.

In view of the above, it is an object of the present invention to provide a method of preparing multiplicities of color cathode ray or television picture tube envelope parts from which sets of complemental parts may be randomly selected, and referenced and sealed to each other in such a manner as to provide tube envelopes in which optimum alignment of the electronic components of each completed tube may be readily attained.

It is another object of the invention to provide a method of optimum alignment of television picture tube envelope parts prior to the sealing of each such part to its complemental part.

In accomplishing the above objects of the invention, the viewing panels and funnels to be used in the fabrication of cathode ray or television picture tube envelopes are each provided with a plurality of reference points adjacent the sealing edges thereof by which such parts may be optimumly referenced to each other for the sealing of such edges together in the fabrication of a tube envelope.

Other objects and characteristic features of the invention will become apparent as the description proceeds.

The invention will best be understood with reference to the accompanying drawings in which.

Similar reference characters refer to similar parts in each of the figs. of the drawings.

Figure 1:
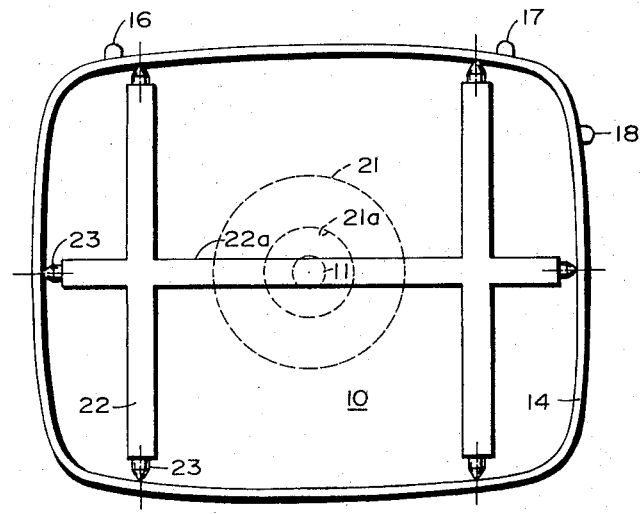
FIGS. 1 and 2 illustrate the first step in the preparation, in accordance with the method of the present invention, of funnel and neck portions used to form a composite funnel-neck part to be used in the fabrication of a cathode-ray or television picture tube envelope.
Figure 2:
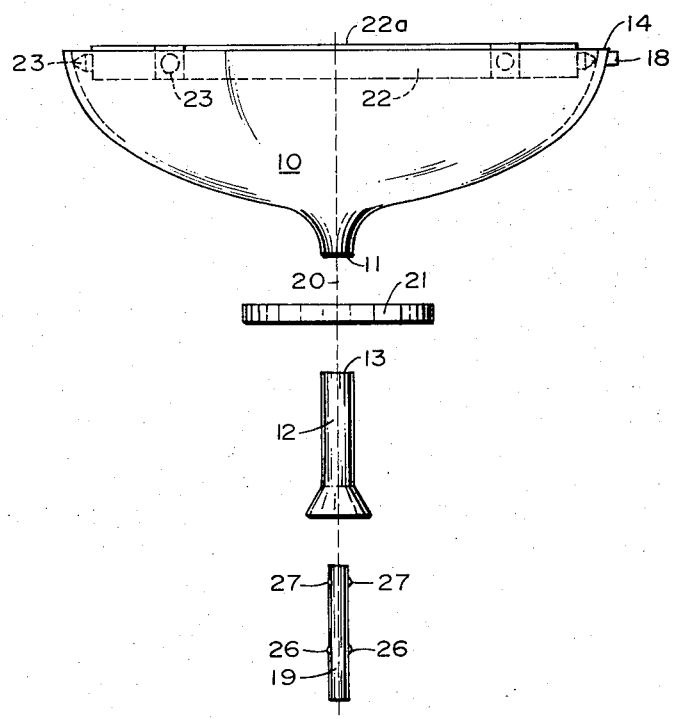

Referring to FIGS. 1 and 2 of the drawings, there is shown a funnel portion 10 and a tubular neck portion 12 for use in the fabrication of a cathode ray tube envelope and which may be randomly selected from a multiplicity of such parts. Funnel 10 is formed with a plurality of protuberances 16, 17 and 18 projecting outwardly from two adjacent sidewalls thereof adjacent the edge or rim 14 of the large end of the funnel, such protuberances to be used for a purpose hereinafter discussed. The small end 11 of funnel 10 is formed to be complemental to the small end 13 of neck 12 so that such parts may be sealed to each other at such ends to form a composite funnel-neck part for a cathode ray tube envelope.

The following described example of the practice of the inventive method herein disclosed is given in conjunction with one simple form of apparatus which may be used in such practice.

In sealing the neck portion 12 to the funnel portion 10, a fixture is employed which comprises a cylindrical mandrel 19 (FIG. 2), an annular funnel support 21 (FIGS. 1 and 2) and a funnel centering and aligning device 22 having an H-shaped configuration. Mandrel 19 is provided with a first group of neck alignment members, such as 27, comprising three spheres, a portion of each of which projects out through one of a group of three holes symmetrically provided 120 degrees apart around the peripheral surface of the mandrel near one end thereof and extending inward towards the center of the mandrel. Such spheres or balls are identically spring biased to normally protrude out, each an equal distance, through their respective holes but, by applying pressure thereto, each may be forced, against such spring biasing, a small but equal distance into their respective holes. A second similar group of neck alignment members, such as 26, are similarly provided near the other end of mandrel 19. Mandrels such as 19, provided with such groups of spring biased balls or spheres, are well known and are often employed for supporting tubular workpieces, and the mandrel 19 itself forms no part of the present invention. It is pointed out, however, that the diameter of mandrel 19 is so selected that the balls, such as 26 and 27, will contact the inner surface of the tubular neck 12, that is, the inner surface defining the hollow extending longitudinally through the center of the neck, when the neck is projected onto said mandrel.

The annular funnel support 21 includes a circular orifice 21a (FIG. 1) which extends completely through the support. Such support and mandrel 19 are disposed in relation to each other so that a line, extending axially and longitudinally through the center of such cylindrical mandrel and indicated by reference 20, also extends normal to the plane of the top planar surface of support 21 and precisely through the geometric center point of the circular orifice 21a of such support, such support and mandrel being mounted in any convenient manner so that they may be axially moved toward each other along said axial line or axis without disturbance of the axial alignment of such parts, or disturbance of said plane of the top surface of support 21 from its alignment normal to such axial line or axis.

The H-shaped funnel aligning device 22 includes a crossbar 22a, the ends of which extend beyond the uprights forming the H configuration of the device, and the ends of such crossbar, as well as the ends of the uprights, are each provided with a button such as 23, each of which is intended to contact the inner surface of the opening in the large end of funnel 10 as illustrated in FIG. 1 of the drawings. The H-shaped aligning device 22 is, similarly to the so-called rectangular large end of funnel 10, bisymmetrical or doubly symmetrical and, therefore, the precise center point of the crossbar 22a is equidistant from the ends of corresponding ones of said buttons such as 23. That is to say, such center point is equidistant from the end of each of the buttons provided at the ends of the uprights of the H-shaped device, and is also equidistant from the ends of the buttons provided at the ends of the crossbar 22a of such device. In other words, when the H-shaped funnel aligning device 22 is positioned in the opening at the large end of funnel 10 so that said buttons contact the inner surface of such funnel, as illustrated in FIG. 1, the funnel is laterally aligned so that said center point of the crossbar 22a of the device coincides with the center point of such opening or, for further clarification, coincides with the point of intersection of first and second lines extending through the center points of first and second pairs of opposite sidewalls of the large end of funnel 10, such lines intersecting each other perpendicularly, as is obvious.

Aligning device 22 is disposed in relation to support 21 and mandrel 19 so that said axis or axial line indicated by the reference 20 extends normal to a plane extending through the ends of the panel contacting buttons, such as 23, provided on the ends of the crossbar 22a and the ends of the uprights of the funnel aligning device 22, and also so that said axial line coincides precisely with said center point of the crossbar 22a, such aligning device being mounted in any convenient manner so that it may be axially moved toward said support 21 and mandrel 19 along said axial line without disturbance of the alignment of the center point of the crossbar 22a with said line, and without disturbance of said alignment of such axial line normal to said plane extending through the ends of the buttons such as 23.

Referring further to FIGS. 1 and 2, in the fabrication of a composite funnel-neck part for a cathode ray tube envelope in accordance with the present invention, a neck portion such as 12 is projected onto mandrel 19 with the hollow through said neck surrounding said mandrel and being contacted on its inner surface with the first and second groups of neck alignment devices such as 26 and 27. This assures that an axial line extending longitudinally through geometric center of the hollow in said neck coincides with the axial line extending longitudinally through the center of cylindrical mandrel 19.

Next the small end 11 of a funnel portion, such as 10, is lowered through the orifice 21a in the annular support 21 so that the circumference of the orifice 21a contacts and surrounds a circular area of the funnel 10 above its end 11. This later assures radial alignment of the geometric center of the opening in the small end 11 of funnel 10 with the geometric center of the opening in the end 13 of neck 12. Thereafter the funnel 10 and its annular support 21 are lowered until the lower end 11 of funnel 10 abuts the end 13 of neck 12.

Following the above steps, the funnel aligning device 22 is lowered into the opening in the large end of the funnel until the buttons, such as 23, contact the inner surface of the opening in such end of the funnel. This step assures the lateral alignment of the opening in the large end of the funnel with reference to said axial line 20, that is, the alignment of the geometric center of the large end of the funnel with said axial line, as previously discussed.

The neck and funnel are then sealed together at the line of abutment of the small end 11 of funnel 10 and the end 13 of neck 12 with assurance that the axial line extending longitudinally through the center of the hollow of neck 12 is aligned with the geometric center point of the large end of funnel 10, that is, with assurance that the neck is not tilted with respect to such center point nor off center with respect to such point. The sealing of the funnel and neck portions to each other to form a composite funnel-neck part may be performed, for example, by flame sealing as is well known in the art.

Figure 3:
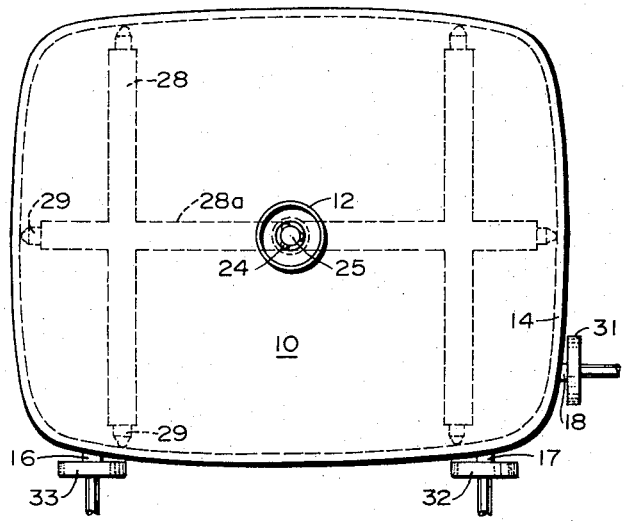
FIGS. 3 and 4 illustrate a second step in said method of preparation of a composite funnel-neck part in accordance wtih the invention.
Figure 4:
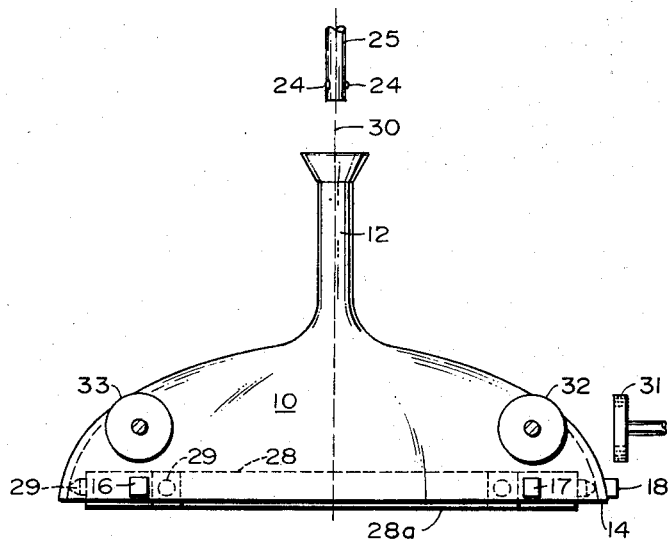

The second broad step in the method, according to the present invention, is illustrated in FIGS. 3 and 4 of the drawings. A funnel-neck composite part, fabricated as previously discussed, is placed, as shown in FIGS. 3 and 4, with the opening in the large end of the funnel 10 disposed over a funnel aligning device 28 which is identical to the device 22 of FIGS. 1 and 2, and which also includes a crossbar 28a and buttons such as 29 which contact the inner surface of the opening in the large end of funnel 10, such parts being identical to their corresponding parts on aligning device 22. A cylindrical mandrel 25, similar to mandrel 19 of FIG. 2, is mounted so that its axial line extending longitudinally through the center thereof, as indicated by the reference 30, precisely coincides with the center point of the crossbar 28a of funnel aligning device 28, and also so that such axial line extends normal to a plane extending through the ends of the buttons, such as 29, provided on the ends of the uprights and said crossbar of the H-shaped device 28. Mandrel 31 differs from mandrel 19 of FIG. 2 in that it is provided with only a single group of neck alignment devices or spheres, such as 24, such group corresponding to the group of spheres, such as 27, provided on mandrel 19. Mandrel 25 is mounted in any convenient manner, so that it may be moved precisely along said axial line toward aligning device 28 without disturbing said alignment of the axial line of the mandrel with said center point of crossbar 28a of the device 28, and without deviation in the normality of such axial line to said plane of aligning device 28. Thus, when mandrel 25 is moved along said axial line towards the aligning device 28 with a composite funnel-neck part disposed over device 28 as shown in FIGS. 3 and 4, if the axial line extending through the geometric center of the hollow of the neck portion of the composite funnel-neck part is not precisely aligned with the center point of crossbar 28a, mandrel 25, in being projected into the hollow of neck 12, wil cause the funnel-neck part to move to bring said axial line of the neck into alignment with the center point of crossbar 28a. It is then assured that precise positioning of the composite funnel-neck part is attained.

There is also shown in FIGS. 3 and 4, a plurality of three grinding wheels designated 31, 32 and 33. The faces of wheels 32 and 33 are disposed in a plane extending normal to said plane of aligning device 28, parallel with the crossbar 28a of such aligning device, and a preselected horizontal distance from a centerline extending through the centers of the shorter sidewalls of funnel 10. The face of wheel 31 is disposed in a plane extending normal to said plane of the faces of wheels 32 and 33, and a preselected horizontal distance from a centerline extending through the centers of the longer sidewalls of funnel 10. Wheels 31, 32 and 33 are also disposed in relation to aligning device 28 that, when a composite funnel-neck part is precisely aligned on such device in the above described manner, that is, by the insertion of mandrel 31 into the neck 12 of said part, said wheels are located above and their faces and, therefore, their grinding edges overhang protuberances 16, 17 and 18 provided on the sidewalls of the funnel 10, as illustrated in FIGS. 3 and 4. Wheels 31, 32 and 33 are as stated, normally disposed above aligning device 28 but are precisely mounted, in any convenient manner in relation to such device, so that they may be moved downwardly, with their faces maintained in their said respective planes, to precisely grind reference summits on the respectively associated ones of said protuberances, said summits being said preselected horizontal distances from said respective centerlines. Thus said second broad step in the method of the present invention comprises the provision of precisely ground reference summits on the protuberances 16, 17 and 18 of a funnel portion of a composite funnel-neck part.

Figure 5:
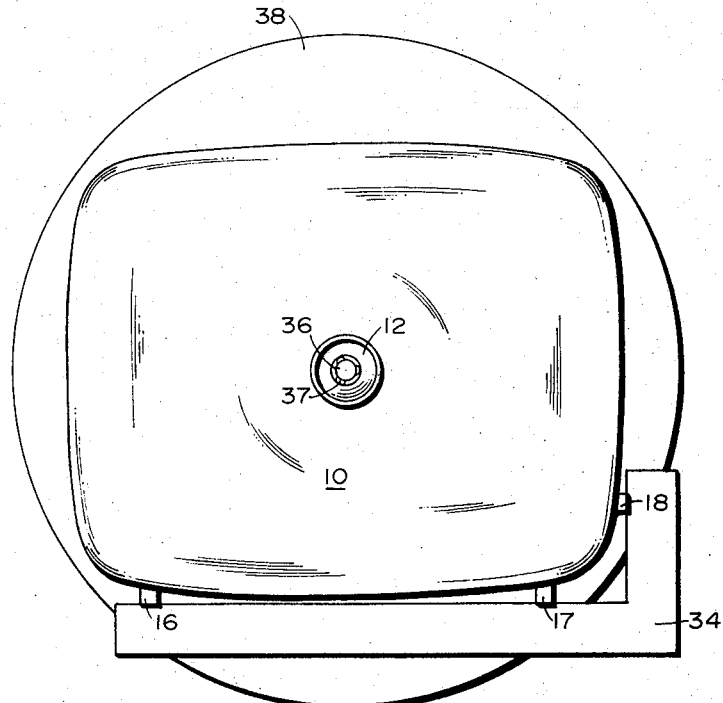
FIGS. 5 and 6 illustrate a third step in the method of preparation of said composite part.
Figure 6:
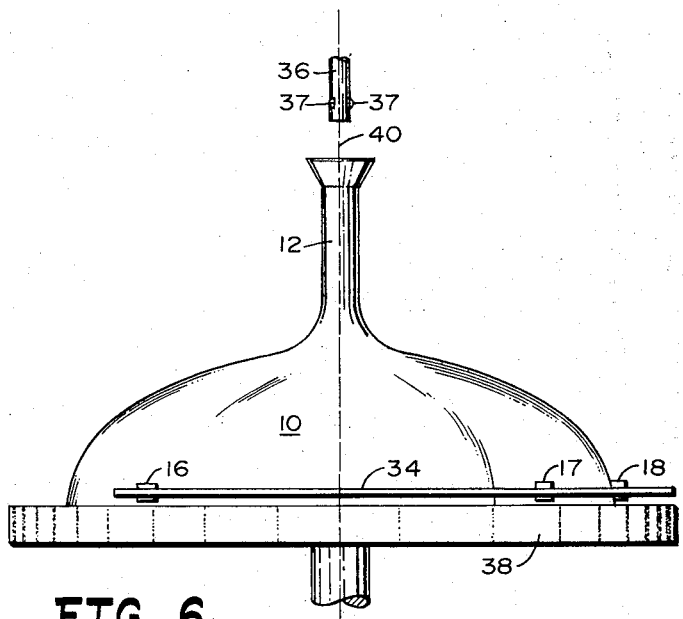

FIGS. 5 and 6 illustrate a third broad step in the preparation of cathode ray or television picture tube envelope parts according to the invention. Referring to such drawing, there is shown a large grinding wheel 38 having a diameter somewhat larger than the diagonal dimension across the large end of a funnel, such as 10, of a composite funnel-neck part shown in such drawings with the seal edge or rim of the large end of the funnel disposed on the top planar surface of said grinding wheel for grinding of such seal edge. An L-shaped reference frame 34 is located in relation to said top surface and the geometric center of grinding wheel 38 so that when the seal edge or rim of a composite funnel-neck part is disposed on the grinding wheel with the reference summits ground on said protuberances 16, 17 and 18 firmly against the inside edges of said reference frame 34, as illustrated in FIGS. 5 and 6, the geometric center point of the large end of the funnel 10 of said composite part coincides with said center of the grinding wheel. The reference frame 34 may be mounted in any convenient manner in order to provide and maintain the positions of the inside edges of such frame in relation to said center of grinding wheel 38. It will be noted that the inside edges of frame 34 can, if desired, be precisely located in their necessary positions by employing said preselected horizontal distances used in locating the faces of said grinding wheels 31, 32 and 33 of FIGS. 3 and 4.

A cylindrical mandrel 36 identical to the mandrel 25 of FIGS. 3 and 4, and including a single group of neck aligning spheres such as 37, which correspond to the similar spheres such as 24 of mandrel 25, is disposed above the top planar surface of grinding wheel 38 with a line extending through the center of the longitudinal axis of the mandrel 36 also extending through said center of the grinding wheel and normal to said top planar surface. Such axial line is indicated by reference 40. Mandrel 36 may be mounted in said position in any convenient manner but it is also mounted so that it may be moved along line 40 so that said line of the axis of the mandrel is maintained aligned with the center of wheel 38 and normal to the top planar surface of such wheel.

In performing the step illustrated in FIG. 3, a composite funnel-neck part is positioned on the top planar surface of grinding wheel 38 (FIGS. 5 and 6) with its large sealing edge or rim 14 (FIGS. 1 through 4) resting on such surface and with the summits ground on the protuberances 16, 17 and 18 against the inside edge of frame 34 as illustrated in FIGS. 5 and 6. Mandrel 36 is then moved along said axis or axial line indicated by the line 40 and into the hollow of the neck 12 of the composite funnel-neck part, the axial alignment of mandrel 36 with the center of grinding wheel 38 and normal to the top surface of such wheel, as previously mentioned, being maintained during such movement of mandrel 36. If the surface of the sealing edge or rim 14 of funnel 10 does not extend in a plane normal to said axial line 40, the insertion of mandrel 36 into the hollow of neck 12 and the resulting contacting of the neck aligning devices or spheres 37 on mandrel 36 with the inside surface of the hollow or neck 12 will cause the composite funnel-neck part to move, as is readily apparent, and, so long as the summits on protuberances 16, 17 and 18 are maintained against the inside edges of frame 34 as illustrated in FIG. 5, the sealing surface of rim 14 will rest on the top surface of wheel 38 so that, if such sealing surface is then ground by the rotation of grinding wheel 38, until the plane of the sealing surface coincides with the top surface of wheel 38, the plane of such sealing surface, similarly to the plane of such top surface of wheel 38, will extend normal to said axial line 40. This is believed readily apparent from a brief study of FIGS. 5 and 6 of the drawings. If the sealing surface of rim 14 does coincide with the top surface of wheel 38 when mandrel 36 is inserted into the hollow of neck 12 as described, the grinding operation performed by the rotation of grinding wheel 38 against said sealing surface need not be of long duration but need be performed only long enough to smooth such sealing surface for subsequent sealing to the complemental sealing edge of a cathode ray tube envelope viewing panel, as hereinafter pointed out.

Following the step illustrated in FIGS. 5 and 6, each composite funnel-neck part, including funnel 10 and neck 12, is in its stage of preparation of optimum alignment and sealing to a viewing panel portion, in the fabrication of a cathode ray tube envelope.

Figure 7:
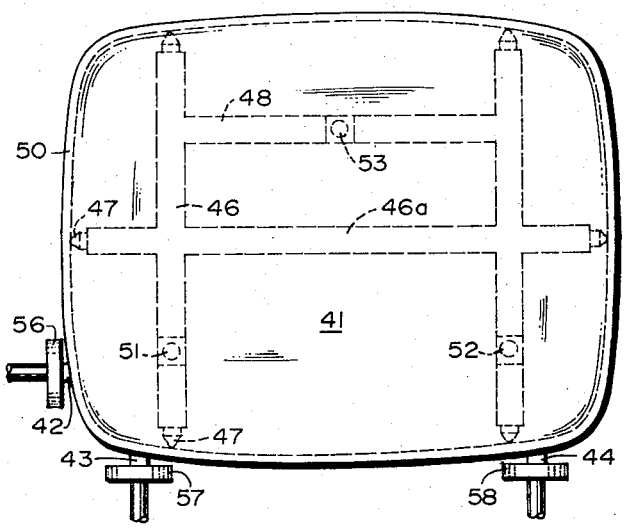
FIGS. 7 and 8 illustrate another step in accordance with the invention in which a viewing panel portion is prepared for subsequent optimum referencing and sealing to one of said composite funnel-neck parts to produce a composite cathode ray or television picture tube envelope.
Figure 8:
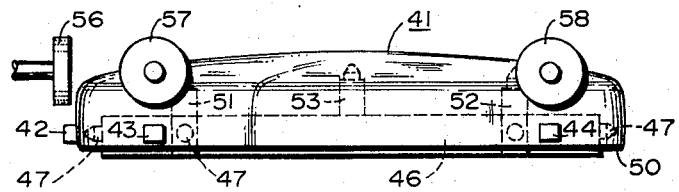

Referring now to FIGS. 7 and 8 of the drawings, there is illustrated a fixture, somewhat similar to that illustrated in FIGS. 3 and 4 of the drawings, but employed for preparing a viewing panel for optimum referencing and sealing to one of the composite neck-funnel parts prepared in accordance with the steps of the invention illustrated in FIGS. 1 through 6, and as described in the foregoing discussion. The fixture illustrated in FIGS. 7 and 8 includes an H-shaped panel aligning device 46, similar to that shown in FIGS. 3 and 4 of the drawings but including for the purpose hereinafter discussed, an additional crossbar 48. The ends of the uprights and crossbar 46a each include a panel contacting device or button, such as 47, which are intended to contact the inside surface of the depending skirt of a viewing panel, such as 41, when such a panel is placed over the aligning device 46 as illustrated in FIGS. 7 and 8. The H-shaped aligning device 46 is, similarly to the so-called rectangular viewing panels such as 41, bysymmetrical or doubly symmetrical and, therefore, when the cavity defined by the interior annular surface of the depending skirt of a viewing panel such as 41 is disposed over said aligning device with the buttons such as 47 contacting said surface as illustrated in FIGS. 7 and 8, such panel is laterally aligned so that the center point of said cavity coincides with the point of intersection of first and second centerlines extending through the center points of first and second pairs of opposite sidewalls forming the depending skirt of the viewing panel. As is obvious, such lines intersect each other perpendicularly.

The uprights and the previously mentioned additional crossbar 48 of the H-shaped aligning device 46 are each provided with an upstanding panel support or supporting device, such devices being designated 51, 52 and 53, as shown in FIGS. 7 and 8 of the drawings, and each including a panel contacting button on the upper end thereof. Said supports and their respective buttons are located on their respective crossbar or uprights so that the buttons contact the inside surface of a face plate of a viewing panel such as 41 at the three different points of a substantially equilateral triangle, as illustrated in FIG. 7, and so that the plane of the surface of the sealing edge or rim 50 of such viewing panel extends parallel with a plane extending through the ends of the buttons, such as 47, provided on the ends of the uprights and crossbar 46a of aligning device 46.

A plurality of three grinding wheels designated 56, 57 and 58 is also shown in FIGS. 7 and 8. The wheel 56 is disposed so that its face is coextensive with a plane extending normal to the plane of the surface of sealing edge 50 of a viewing panel, such as 41, when such a panel is disposed on aligning device 46, and parallel to the centerline extending through the centers of the longer sidewalls of such viewing panel. The wheels 57 and 58 are disposed so that their faces are coextensive with a plane extending normal to the plane of the surface of said sealing edge 50 of a viewing panel such as 41, when such a panel is disposed on aligning device 46, and parallel to the centerline extending through the centers of the shorter sidewalls of said viewing panel. It is therefore obvious that the face of wheel 56 is coextensive with a plane extending normal to a plane coextensive with the faces of wheels 57 and 58. The mounting of grinding wheels 56, 57 and 58 will be further discussed hereinafter in this description.

Each of the viewing panels such as 41, is provided, in the forming thereof, with a plurality of at least three protuberances, such as 42, 43 and 44 (FIGS. 7 and 8) on two adjacent sidewalls of the panel adjacent the sealing edge or rim 50. Said protuberances are provided on said sidewalls at locations such that when the surface of the sealing edge 50 of a viewing panel is abutted in a sealing relationship against the surface of a sealing edge 14 of a composite funnel-neck part, with such panel and part rotationally complemental to each other, the protuberances on the sidewalls of said viewing panel are complemental to the corresponding protuberances provided on the sidewalls of said funnel-neck part. The purpose of such location of the protuberances on the sidewalls of the viewing panels such as 41 will be pointed out hereinafter.

Returning to the grinding wheels 56, 57 and 58 shown in FIGS. 7 and 8 of the drawings, such wheels are located so that the respective aforementioned planes, with which the faces of such wheels are coextensive, are preselected horizontal distances from said centerline to which such respective planes are parallel. Such distances are selected so as to correspond to the previously mentioned horizontal distances by which the faces of the corresponding respective wheels 31, 32 and 33 of FIGS. 3 and 4 are positioned. Wheels 56, 57 and 58 (FIGS. 7 and 8) are normally positioned above the viewing panel aligning device 46 as shown in FIG. 8, but such wheels are mounted in relation to device 46, in any convenient manner, so that wheels may be moved downwardly or toward device 46 with the faces of the wheels and, thus, their peripheral grinding edges remaining in their respective planes previously discussed.

In the further preparation of a viewing panel formed with protuberances as described, such a panel 41 shown in FIGS. 7 and 8 of the drawings, the panel is positioned on aligning device 46 with the buttons of supports 51, 52 and 53 contacting the inner surface of the face plate of the viewing panel, thus horizontally supporting the panel; and with the annular interior surface of the depending skirt of the panel contacting the buttons such as 47 of device 46, thus rotationally and laterally aligning the panel. Following such positioning of the viewing panel, the grinding wheels 56, 57 and 58 are moved downwardly to grind summits on protuberances 42, 43 and 44, respectively, the ends of such proturberances extending beneath their respectively associated wheels as shown in FIG. 7. Such summits provide reference points for repeatedly and accurately positioning said panel for the deposition of color-emitting phosphors on the inner surface of the face plate thereof, as previously discussed, and for referencing the surface of the sealing edge of said panel to the complemental surface of the sealing edge of one of the previously discussed composite funnel-neck parts for sealing such edges together to fabricate a cathode ray or television picture tube envelope. Thus, following the step illustrated in FIGS. 7 and 8, each viewing panel so prepared may be optimumly aligned with and sealed to a composite funnel-neck part prepared as previously described. Such alignment may be attained by the use of a modified L-shaped frame, similar to the L-shaped frame 34 shown in FIG. 5 of the drawings but constructed so that the summits, ground on the protuberances provided on both of said tube parts, may simultaneously contact the inside edge of the modified frame.

Briefly, in summary of the present invention, there is herein disclosed a method comprising the preparation of parts for the optimum alignment and sealing of such parts in the fabrication of tube envelopes to be used in manufacture of cathode ray or television picture tubes, such method being especially useful in the fabrication of tube envelopes for the color television picture tube industry. The inventive method disclosed comprises the steps of forming complemental viewing panel portions and funnel portions for rectangular cathode ray tube envelopes, each such part being formed with a plurality of reference protuberances, such protuberances on each viewing panel being complemental to corresponding protuberances on a funnel when a pair of such parts are disposed in sealing relationship with each other; aligning the sealing end of a tubular neck portion with the complemental sealing end of a funnel portion so that said neck portion is axially aligned with the center of the opening in the large end of the funnel, and sealing such parts together while maintaining such alignment; grinding reference summits on said protuberances on each composite funnel-neck part in accordance with a rotational and lateral alignment of the funnel of the respective part, and in accordance with an axial alignment of the neck of the respective composite part, such axial alignment being similar to said axial alignment of the previous step; axially aligning, in accordance with said summits ground on said protuberances, the neck of each funnel-neck composite part normal to the center of a grinding plane, and grinding the surface of the sealing edge of the large end of each such aligned part to conform to such plane; and grinding reference summits on said protuberances on each said viewing panel portion in accordance with a rotational and lateral alignment of each such portion, such alignment complementally corresponding to the similar alignment of each said composite funnel-neck part; whereby the parts of randomly selected pairs of such parts, each such pair comprising a composite funnel-neck part and a viewing panel, may be optimumly referenced to each other by means of said reference summits, and sealed together, in accordance with such referencing, so that the neck of each such respective part is axially aligned with the center of its respective viewing panel and normal to the face plate of such panel.

Although there is herein discussed only one specific example of the practice of the method of the present invention, it is to be understood that the inventive method disclosed is not intended to be limited to such example but only by the spirit and scope of the appended claims.

What is claimed is:

1. The method of preparing parts for rectangular glass cathode ray tube envelopes each fabricated from complemental parts including a neck, a funnel and a rectangular concavo-convex viewing panel, such method comprising; forming said funnels and viewing panels with sidewalls including sealing edges and a plurality of at least three protuberances projecting outwardly from two adjacent ones of the sidewalls of each such part, such sidewalls, sealing edges and protuberances on a funnel being complemental to such corresponding portions on a viewing panel when the sealing edges of a pair of such parts are disposed in sealing relationship with each other; sealing one end of a neck to the complemental small portion of each said funnel so that a projection of the axis extending through the geometric center of the hollow of such neck is aligned with the geometric center point of the large end of the associated funnel; positioning each such sealed funnel with respect to its said geometric center point and said center of the hollow through its neck, and then grinding reference summits on the protuberances on the sidewalls of each such positioned funnel, each such summit being a predetermined distance from said geometric center point of the respective funnel; positioning each such ground funnel with respect to its said reference summits and said center of the hollow through its neck, and then grinding the sealing edges of each such positioned funnel, in accordance with such positioning, so that said projection of the axis of the sealed neck of the respective funnel extends normal to the plane of such ground edges; and positioning each viewing panel with respect to the geometric center point of its concave cavity, and then grinding reference summits on the protuberances on the sidewalls of each such positioned panel, each such summit being a predetermined distance from said geometric center point of the respective panel, whereby by referencing said reference summits of a neck-funnel portion to those of a viewing panel, with the sealing edges of such parts in abutting relationship, optimum alignment of the parts and their sealing edges may be attained for the purpose of sealing thereof to each other to complete the fabrication of a cathode ray tube envelope.

2. The method of fabricating a cathode ray tube envelope, such method comprising; individually forming a neck portion, a funnel portion and a rectangular concavo-convex viewing panel portion, the funnel and viewing panel portions having sidewalls including complemental sealing edges for joining such portions to each other and a plurality of three reference protuberances transversely and correspondingly disposed on two adjacent ones of the sidewalls of each such portion; dividing the area of the large end of said funnel portion by first and second lines extending through the centers of first and second pairs of opposite sidewalls of such portion, the intersection of such lines defining the geometric center point of said area; sealing said neck portion to the yoke end of said funnel portion so that the axial line extending longitudinally through the geometric center of the hollow in the neck portion also extends through said center point, grinding said reference protuberances on said funnel portion to provide summits thereon in accordance with a preselected axial alignment of said axial line and a preselected rotational alignment of said first and second lines; grinding said sealing edge of said funnel portion in a preselected plane, and in accordance with an alignment of said axial line normal to such plane and a rotational alignment of the summits ground on said protuberances; dividing the face plate area of said viewing panel portion by first and second lines extending through the centers of first and second pairs of opposite sidewalls of the viewing panel portion to determine the geometric center point of the face plate, and grinding said reference protuberances on such portion to provide summits thereon in accordance with a preselected rotational alignment about such center point of the face plate; positioning the sealing edges of said funnel portion and said viewing panel portion in sealing relationship with each by referencing the summits ground on the corresponding protuberances of each portion to each other, and thereafter sealing the sealing edges of said portions to each other in accordance with said positioning of the sealing edges.

3. The method of fabricating a cathode ray tube envelope, such method comprising; individually forming a neck portion, a funnel portion and a rectangular cancavo-convex viewing panel portion, the funnel and viewing panel portions each including sidewalls which cooperate with each other to provide complemental pairs thereof and each such pair of sidewalls including sealing edges for sealing thereof to each other, a first of said pairs of sidewalls each including a pair of protuberances extending transversely the respective sidewall and outwardly therefrom, and one of the pairs of sidewalls adjacent said first pair each including another protuberance extending transversely the respective sidewall and outwardly therefrom; sealing said neck portion to the yoke area of said funnel portion so that the axial line extending longitudinally through the geometric center of the hollow in said neck portion also extends through the geometric center of and normal to the planar area defined by the periphery of the large end of said funnel portion; grinding said protuberances on said funnel portion to provide on each a planar surface longitudinally aligned with said axial line, the summits of the planar surfaces ground on said pair of protuberances on the funnel portion being equally ground a predetermined distance from a line extending through the centers of a first pair of opposite sidewalls of the funnel portion and the summit of the planar surface ground on the protuberance on said adjacent sidewall being ground a predetermined distance from a line extending through the centers of the other pair of opposite sidewalls of the funnel portion; grinding said protuberances on said viewing panel portion to provide thereon planar surfaces having summits corresponding to those provided on the protuberances on said funnel portion, grinding a horizontal plane on said sealing edges of the funnel portion so that said axial line extends normal to such horizontal plane; and positioning the summits of the corresponding pairs of protuberances on said viewing panel and funnel portions in reference to each other so that said sealing edges of said portions align, and thereafter sealing said funnel and viewing panel to each other along said sealing edges in accordance with such alignment of the sealing edges.

4. A composite article of manufacture to be used in the fabrication of a rectangular cathode ray tube envelope, such article comprising; a funnel part having a substantially rectangular large end, the periphery of which is provided with a sealing edge and which tapers down to a circular small end; a cylindrical neck part having a hollow extending longitudinally therethrough and having an end complementary to said small end of said funnel part, such ends of such part being sealed together so that an imaginary axial line extending through the geometric center of said hollow also extends through the geometric center of said large end of the funnel part; a plurality of at least three protuberances projecting outwardly from two of adjacent sidewalls of said rectangular large end of said funnel part and longitudinally extending substantially normal to said sealing edge; a summit provided on each said protuberance, each such summit being a predetermined distance from and extending parallel to said axial line; and a surface ground on said sealing edge, such surface being normal to said axial line and said summits, whereby a rectangular viewing panel having a sealing edge with a surface complemental to said surface of the sealing edge of said funnel part, and having protuberances provided with summits corresponding and complemental to those of such funnel part, can be optimumly sealed to such part by abutting said sealing edges with said corresponding summits referenced to each other.

5. The method of preparing parts for a rectangular glass cathode ray tube envelope fabricated from complemental parts including a neck, a funnel and a rectangular concavo-convex viewing panel; such method comprising; forming said funnel and viewing panel with sidewalls including sealing edges and a plurality of at least three protuberances projecting outwardly from two adjacent ones of the sidewalls of each such part, such sidewalls, sealing edges and protuberances on the funnel being complemental to such corresponding portions on the viewing panel when the sealing edges on such parts are disposed in sealing relationship with each other; sealing one end of a neck to the complemental small portion of said funnel so that a projecting of the axis extending through the geometric center of the hollow of such neck is aligned with the geometric center point of the large end of such funnel; positioning said funnel with respect to its said geometric center point and the geometric center of the hollow through said neck, and then grinding reference summits on the protuberances on the sidewalls of such positioned funnel, each such summit being a predetermined distance from said geometric center point of the funnel; positioning said funnel with respect to said reference summits and said center of the hollow through said neck, and then grinding the sealing edges of the funnel, in accordance with such positioning, so that said projection of the axis of said neck extends normal to the plane of such ground edges; and positioning said viewing panel with respect to the geometric center point of its concave cavity and grinding reference summits on the protuberances on the sidewalls of such panel, each such summit being a predetermined distance from said geometric center point of the panel; whereby by referencing said reference summits of a neck-funnel portion to those of a viewing panel, with the sealing edges of such parts in abutting relationship, optimum alignment of the parts and their sealing edges may be attained for the purpose of sealing thereof to each other to complete the fabrication of a cathode ray tube envelope.

6. The method of fabricating a cathode ray tube envelope, such method comprising; individually forming a neck portion, a funnel portion and a rectangular concavo-convex viewing panel portion, the funnel and viewing panel portions being formed with sidewalls including complemental sealing edges and a plurality of three reference protuberances projecting outwardly from two adjacent ones of said sidewalls of each portion; sealing said neck portion to said funnel portion so that the geometric center of the hollow extending through said neck portion is aligned with the geometric center of the large end of such funnel portion; grinding summits on said protuberances on said viewing panel and funnel portions so that when corresponding ones of said summits are referenced to each other, with the sealing edges of such portions abutting, such portions will attain a geometrically matched relationship; grinding said sealing edge of said funnel portion so that the geometric center of the hollow extending through said neck portion is normal to the plane of such sealing edge; referencing said viewing panel and funnel portions to each other in said geometrically matched relationship, and with said sealing edges abutting; and sealing said abutting sealing edges to each other to complete the fabrication of said tube envelope.

References Cited
UNITED STATES PATENTS

| | | |
|---|---|---|
| 2,639,555 | 5/1953 | Buttino et al. |
| 2,871,087 | 1/1959 | Knochel. |
| 2,959,493 | 11/1960 | Vincent. |
| 3,319,818 | 5/1967 | Hudson _____ 220—2.1 |

MARTHA L. RICE, *Primary Examiner.*

THERON E. CONDON, *Examiner.*